April 20, 1954           L. G. SPETH           2,675,712
STOP FOR ANTIFRICTION SCREWS AND NUTS
Filed Dec. 4, 1950
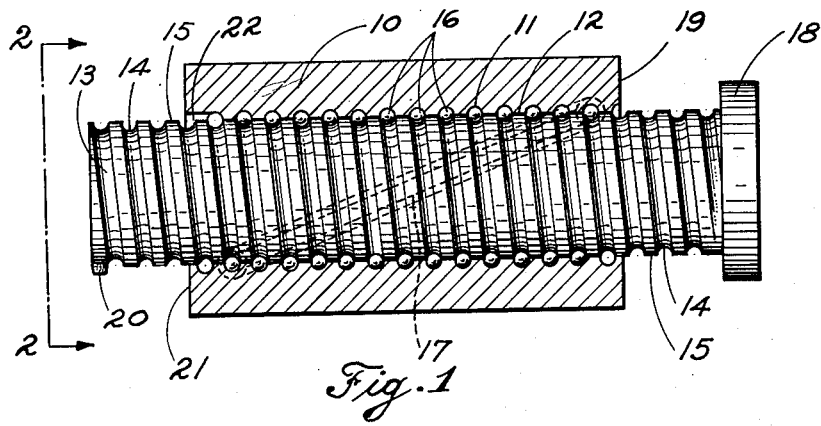
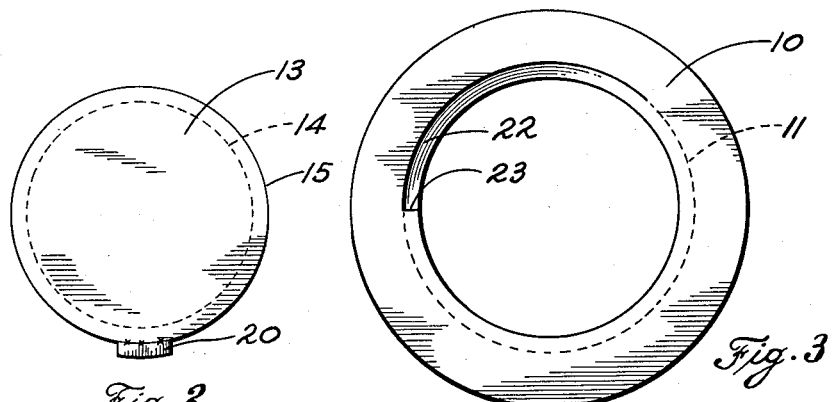
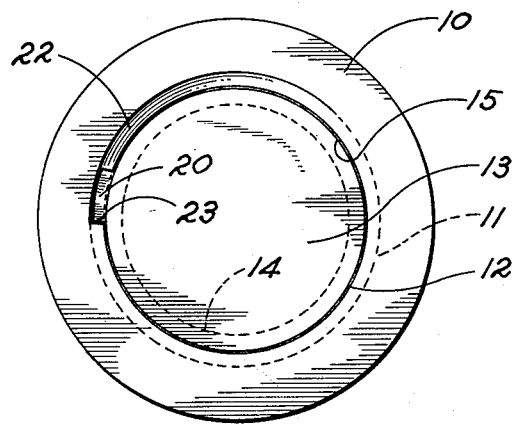
INVENTOR.
LLOYD G. SPETH
BY
ATTORNEY Patented Apr. 20, 1954

2,675,712

UNITED STATES PATENT OFFICE 2,675,712

STOP FOR ANTIFRICTION SCREWS AND NUTS

Lloyd G. Speth, South Euclid, Ohio, assignor to The Cleveland Pneumatic Tool Company, Cleveland, Ohio, a corporation of Ohio Application December 4, 1950, Serial No. 199,029

3 Claims. (Cl. 74—459)

This invention relates broadly to an anti-friction screw and nut mechanism of the ball-bearing type, but more particularly to a stop mechanism for limiting relative axial movement of the screw and nut.

One object of this invention is to provide a ball-bearing screw and nut assembly with a simple and efficient device limiting the axial movement of one member relative to the other.

Another object of this invention is to provide such anti-friction screw and nut assembly with a stop preventing accidental disassembly of the parts.

Other objects of this invention not at this time more particularly enumerated will be clearly understood from the following detailed description.

The invention is clearly illustrated in the accompanying drawing, in which:

Figure 1 is a longitudinal view, partly in section, of a ball-bearing screw and nut assembly, embodying the invention.

Figure 2 is an enlarged end view, of the screw only, shown in Figure 1 and looking in the direction of the arrows 2—2, while Figure 3 is a similar view of the nut only.

Figure 4 is an enlarged end view of the screw and nut assembly, looking in the direction of the arrows 2—2 in Figure 1, and showing the stop in operative engagement.

Referring to the drawing, in which like symbols designate corresponding parts throughout the several views, 10 represents a sleeve or nut member having a cylindrical bore extending therethrough, and in its surface being provided with a spiral groove 11. In cross section, this groove is slightly less than a semi-circle and with the normal surface of the bore, defines a spiral ridge 12.

Extending through the nut 10, there is a shaft or screw-member 13 of a maximum diameter slightly less than the inner diameter of the nut. In its surface, the screw is provided with a complemental groove 14, corresponding in pitch to the pitch of the nut groove 11, and of a cross-section also slightly less than a semi-circle. Like the groove 11, the groove 14 also defines with the normal surface of the screw, a spiral ridge 15. The turns of the spiral ridges 12 and 15 can be defined as coils, which as shown in Figure 1, extend in alternating relationship with the turns or coils of the grooves 11 and 14.

When the grooves 11 and 14 are located to coincide, they will form a spiral channel of substantially circular cross-section, in which are inserted a plurality of anti-friction balls 16, which interconnect the nut and screw members, and effect the axial movement of one member relative to the other upon rotation of the former.

As usual in anti-friction screw and nut of the ball bearing type, there is provided a ball recirculating device consisting of a by-pass passage 17, leading from one end portion of the nut to the other.

Referring now more particularly to the invention, it will be understood that if the relative axial movement of the two main members, that is, the screw 13 and nut 10, were not checked, either end of the screw grooved portion could travel beyond the corresponding end of the nut, and cause the balls 16 to drop out of the grooves 11 and 14. This condition would result in the complete disruption of the ball circuit and effect the disassembly of the device.

In the present construction, one end of the screw is provided with an integral collar 18 engageable with the adjacent end 19 of the nut for limiting axial movement of the screw toward the left in Figure 1.

To limit the axial movement of the screw 13 toward the right in Figure 1, there is provided on the last coil of the screw ridge 15, a radial protuberance or lug 20 of a radius slightly smaller than the radius of the nut groove 11. Since the normal diameter of the screw is slightly smaller than the normal inner diameter of the nut, it will be understood that before the insertion of the balls 16 in the spiral channel 11—14, the screw 13, except for the lug 20, would be free to slide axially through the nut. With the lug 20 on the last coil of the screw ridge 15, the screw and nut can be assembled by simply screwing the lug 20 through the groove 11 of the nut.

After insertion of the balls 16 in the spiral channel 11—14, the screw ridges 15 will be placed in coinciding relationship with the corresponding nut ridges 12, thereby preventing the radial lug 20 from entering the nut groove 11 and causing the lug, except for the cut away portion hereinafter described, to engage the end face 21 of the nut 10, or more particularly the last coil of the nut spiral ridge 12.

In practice, it has been found that the engagement of the lug or stop 20 with the end face 21 of the nut 10 for checking further axial movement of the screw, had the tendency to create a jamming action which retarded or prevented the initial motion of the screw in the reversed direction. To overcome this difficulty, the last coil of the nut spiral ridge 12 adjacent the nut end 21 has a cut away portion 22, providing at its inner end a radial shoulder 23. This cut-away portion of the last coil of the nut ridge 12 enables the lug 20 to penetrate into the nut slightly beyond the nut end face 21, and to contact the radial shoulder 23 which is located within its path, to prevent further axial movement of the screw toward the right in Figure 1.

With the engaging surfaces of the lug 20 and shoulder 23 located radially of the nut and screw, the jamming action above referred to is entirely eliminated. The lug 20, which is preferably welded on the last coil of the screw ridge 15, is of a thickness equal to that of the ridge, and of a lateral or peripheral extent sufficient to provide a strong, non-deformable stop, capable of positive engagement with the shoulder 23 for checking further movement of the screw in one direction irrespective of its rotation speed and the load to which it is subjected.

The details of structure and arrangement of parts shown and described may be variously changed and modified without departing from the spirit and scope of the invention.

I claim:

1. In combination, a screw member having a spiral groove and ridge in its surface, a nut member having a complemental spiral groove and ridge in its inner surface, a plurality of balls interengaged between said two members in the grooves thereof for effecting axial movement of one of said members relative to the other upon rotation of the former, a lug extending radially from and peripherally on the spiral ridge of said screw member near one end thereof, a radial shoulder in the spiral ridge of the nut member near one end thereof, the spiral ridge of said nut member from said shoulder to said end thereof being cut away to enable said lug to penetrate into said nut member and engage said shoulder for limiting said axial movement in one direction.

2. In combination, a screw member having a spiral groove and ridge in its surface, a nut member having a complemental spiral groove and ridge in its inner surface, a plurality of balls interengaged between said two members in the grooves thereof for effecting axial movement of one of said members relative to the other upon rotation of the former, a lug extending radially from the last coil of the spiral ridge of said screw member, a radial shoulder in the last coil of the spiral ridge of said nut nearest to said lug, the end portion of said last coil up to said shoulder being cut away to enable said lug to penetrate into said nut member and engage said shoulder for limiting said axial movement in one direction.

3. In combination, a screw member having a spiral groove and ridge in its surface, a nut member having a complemental spiral groove and ridge in its inner surface, a plurality of balls interengaged between said two members in the grooves thereof for effecting axial movement of one of said members relative to the other upon rotation of the former, a lug extending radially from the last coil of the spiral ridge of said screw member, the last coil of the spiral ridge of said nut member nearest to said lug having a cut-away portion defining a radial shoulder located in the path of said lug and engaged thereby for limiting said axial movement in one direction.

References Cited in the file of this patent

UNITED STATES PATENTS

| Number    | Name      | Date          |
|-----------|-----------|---------------|
| 1,477,598 | Sears     | Dec. 18, 1923 |
| 2,057,187 | Gallasch  | Oct. 13, 1936 |
| 2,106,088 | De Tar    | Jan. 18, 1938 |
| 2,446,393 | Russell   | Aug. 3, 1948  |
| 2,478,510 | Stolpe    | Aug. 9, 1949  |
| 2,508,261 | Hosler    | May 16, 1950  |

FOREIGN PATENTS

| Number  | Country       | Date          |
|---------|---------------|---------------|
| 17,877  | Great Britain | Aug. 5, 1911  |
| 343,752 | Germany       | May 11, 1920  |